United States Patent [19]
Kennedy

[11] Patent Number: 5,192,957
[45] Date of Patent: Mar. 9, 1993

[54] SEQUENCER FOR A SHARED CHANNEL GLOBAL POSITIONING SYSTEM RECEIVER

[75] Inventor: Howard L. Kennedy, Phoenix, Ariz.
[73] Assignee: Motorola, Inc., Schaumburg, Ill.
[21] Appl. No.: 724,261
[22] Filed: Jul. 1, 1991
[51] Int. Cl.⁵ .................... H04B 7/185; G01S 5/02
[52] U.S. Cl. ........................................... 342/357
[58] Field of Search .................... 342/357, 356, 352

[56] References Cited

U.S. PATENT DOCUMENTS

| | | | |
|---|---|---|---|
| 4,485,383 | 11/1984 | Maher | 342/352 |
| 4,578,678 | 3/1986 | Hurd | 342/357 |
| 4,754,465 | 6/1988 | Trimble | 375/1 |
| 4,785,463 | 11/1988 | Janc et al. | 342/386 |
| 4,847,862 | 7/1989 | Braisted et al. | 375/1 |

*Primary Examiner*—Theordore M. Blum
*Attorney, Agent, or Firm*—Frank J. Bogacz

[57] ABSTRACT

A shared channel GPS (Global Positioning System) receiver for receiving a plurality of coded satellite signals. The plurality of satellite signals is transmitted by a corresponding plurality of satellites. Since these satellites are moving rapidly with respect to the receiver, Doppler shifting of the signals is exhibited. The signals are converted from analog to digital at intermediate frequency levels. The signals are then separated simultaneously into a plurality of digital signals corresponding to channel information for each transmitting satellite. One channel of the receiver sequence through a number of the satellites on a time division multiplexed basis. The channel estimates a plurality of parameter pertaining to each satellite so that re-acquisition of the satellite's transmission may be facilitated. A processor then converts these channel information signals to pseudo-range and broadcast data for navigation and time purposes.

32 Claims, 11 Drawing Sheets

SEQUENCER FOR A SHARED CHANNEL GLOBAL POSITIONING SYSTEM RECEIVER

CROSS-REFERENCE TO RELATED APPLICATIONS

The present Application is related to co-pending U.S. patent application Ser. No. 636,168 assigned to the same Assignee.

BACKGROUND OF THE INVENTION

The present invention pertains to radio signal receivers and more particularly a global positioning system (GPS) digital receiver.

The global positioning system is a constellation of satellites which transmits navigation information via radio signals. Time and position may be calculated by receivers which are able to receive and process these radio signals. The satellites of the GPS constellation broadcast two BPSK modulated signals at L-band, 1575.42 megahertz (L1) and 1227.6 megahertz (L2). The modulated signals include psuedorandom noise codes and data. The L1 signal carrier is modulated in quadrature with both a clear acquisition code (CA code) and a precise code (P code). The chipping rate of the CA code is 1.023 megahertz and the P code is 10.23 megahertz. The L2 frequency is modulated with only one code, normally the P code.

It is necessary to track at least four satellites of the GPS constellation in order to compute a GPS receiver's position in three dimensions and determine time. One method of tracking at least four satellites, is to assign one receiver channel to track each of the satellites. This is termed continuous tracking. Another method of tracking four satellites with fewer than four channels requires time-sharing of the channels among the four or more satellite signals. This type of tracking is referred to as sequencing.

Data loss may result from the time required to lock-up or synchronize to a particular satellite signal during the sequencing process. Accordingly, such operation requires circuitry which may be set up rapidly by the control circuitry when the time-sharing operation causes switching from one satellite to another. In addition for digital receivers, high Doppler frequencies require high-speed logic to rapidly process the digitized signals.

Further, the time required to re-acquire the data transmission of a satellite including compensation for Doppler shifting is related to the accuracy with which a GPS receiver may determine its precise location. Sequencing through a number of satellite transmissions requires the sequence to quickly lock-up to the satellite's transmission to obtain the satellite's Doppler shift, pseudorange data and the broadcast data.

Accordingly, it is an advantage of the present invention to provide a sequenced GPS receiver which rapidly re-acquires each satellite's data transmission sequentially to accurately perform self position location.

SUMMARY OF THE INVENTION

According to the present invention a novel GPS receiver with rapid re-acquisition of satellite transmissions in the sequenced mode is shown.

A GPS receiver receives a plurality of coded satellite signals from a corresponding plurality of satellites. These coded satellite signals exhibit Doppler shifting as a result of the movement of the satellites with respect to the receiver. The digital GPS receiver includes a conversion of the coded satellite signals to intermediate frequency signals.

Next, the intermediate frequency signals are converted from analog to digital by a converter which simultaneously translates the plurality of intermediate frequency signals to a corresponding plurality of digital signals. An analog-to-digital converter is coupled to the correlator-decimator. The correlator simultaneously converts each of the plurality of digital signals into information signals.

A channel sequencer is coupled to the correlator. The channel sequencer estimates a plurality of parameters which describe each satellite's expected position and an expected frequency of transmission of the coded satellite signals including Doppler compensation. The channel sequencer performs these functions for each of the plurality of satellites on a time division multiplexed basis.

A processor which is coupled to the correlator and to the channel sequencer then retrieves pseudo-range and broadcast information transmitted by each of the satellites in response to the information signals.

The above and other features, and advantages of the present invention will be better understood from the following detailed description taken in conjunction with the accompanying drawings.

DESCRIPTION OF THE PREFERRED EMBODIMENT

Figure 1:
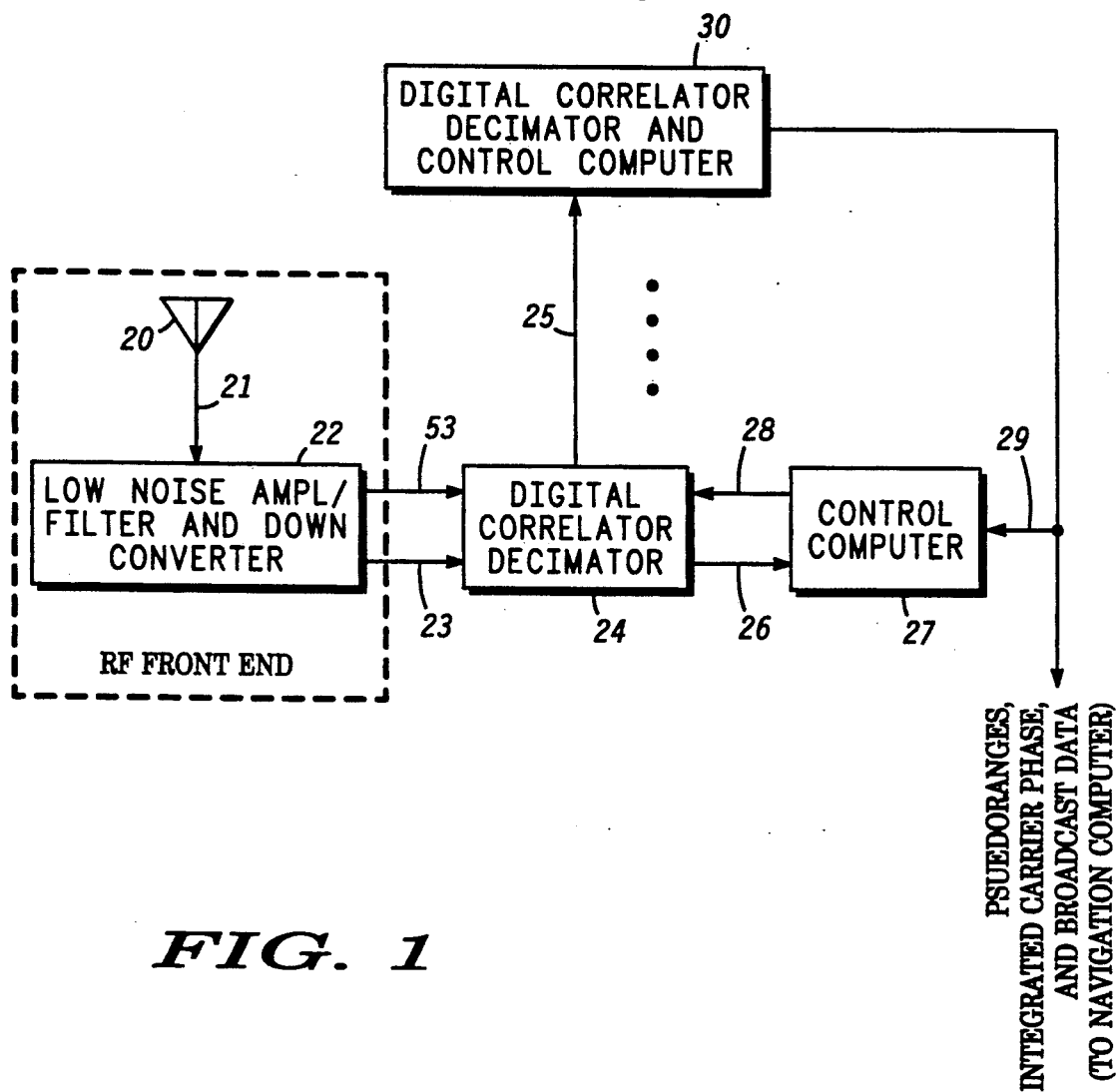
FIG. 1 is an overall block diagram of a GPS receiver in accordance with the principles of the present invention.
Figure 2:
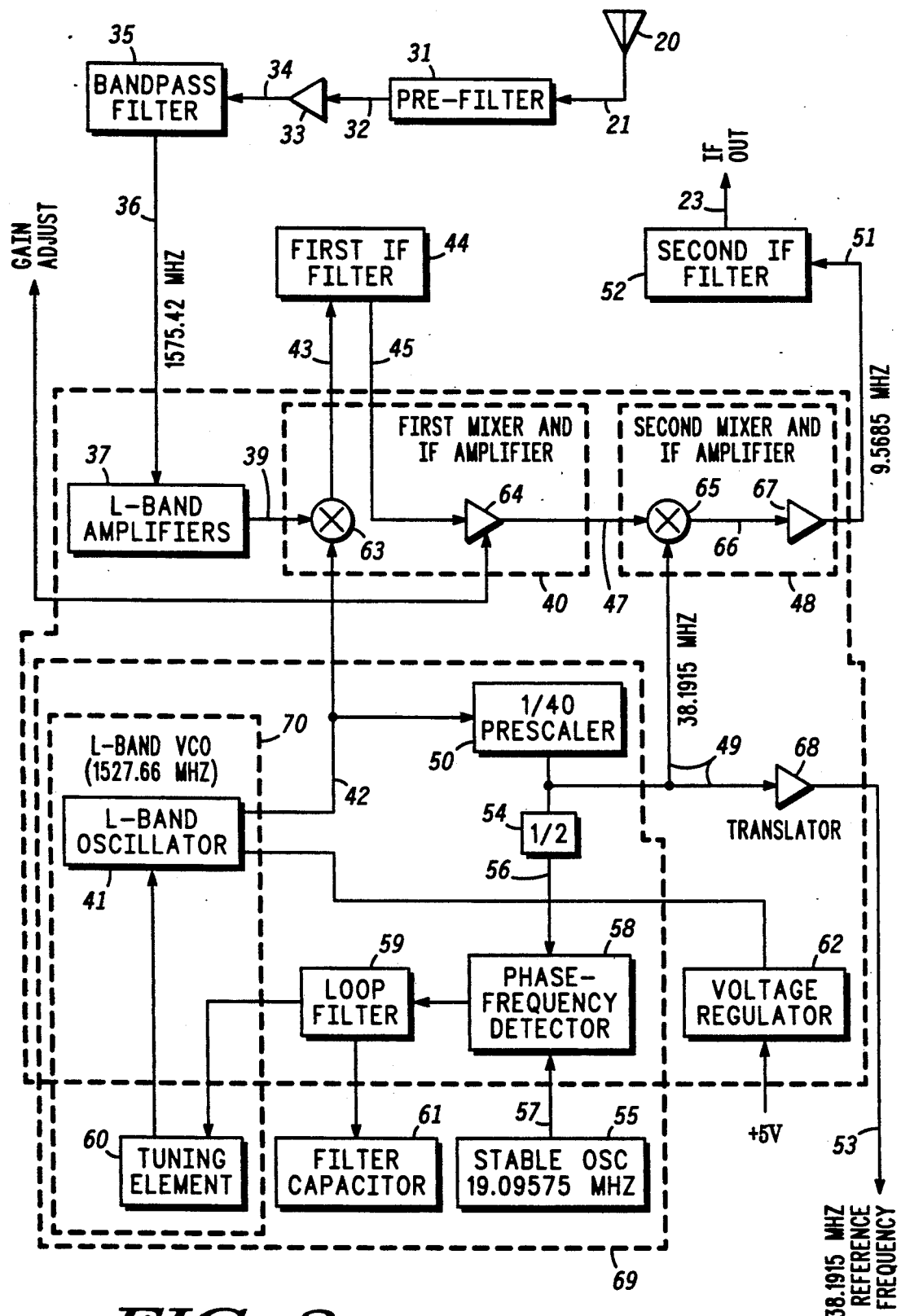
FIG. 2 is a detailed block diagram of the GPS receiver of FIG. 1.

FIG. 1 illustrates the primary functional blocks of the GPS receiver as implemented in accordance with the invention. This figure is shown to employ an antenna 20 that is suitable of receiving the L-band (L1) signals broadcast by the GPS satellites. The present embodiment uses a microstrip "patch" having essentially hemispherical coverage and right hand circular polarization. The antenna output terminals 21 are connected to a down converter 22. Details of the preferred embodiment of down converter 22 are shown in FIG. 2. The output of down converter 22 is an intermediate frequency signal 23 containing the frequency translated satellite signals.

Figure 3:
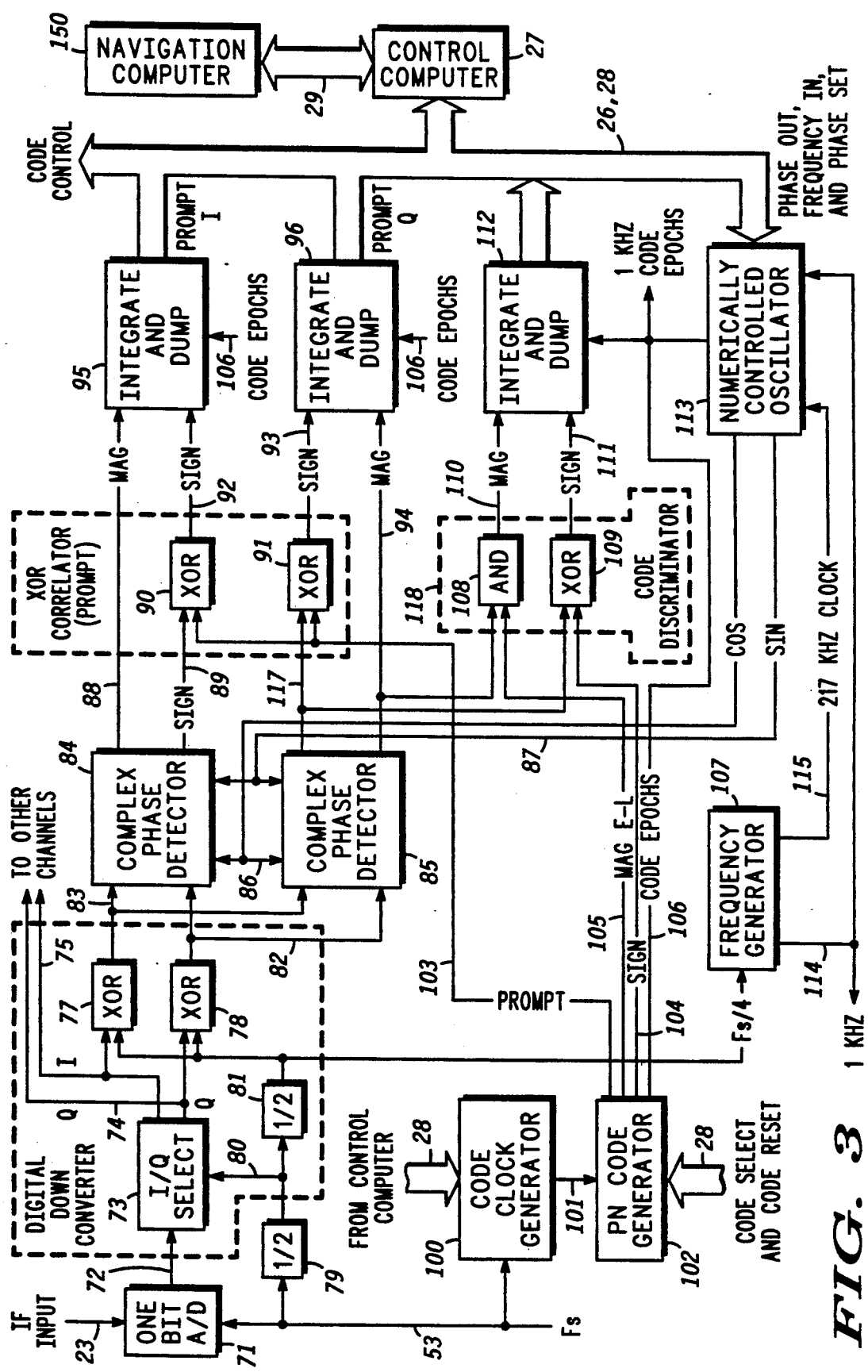
FIG. 3 is a block diagram of a single satellite signal channel of the digital correlator.

Output 23 is connected to a digital correlator decimator 24. The correlator decimator has two output types, a high-speed outputs 25 and decimated outputs 26. The high-speed output 25 provides two signals, they are the uncorrelated digitized in-phase "I" and quadrature "Q" signals. The signals 25 are connected to block 30 which optionally contains an additional number of channels that may operate in parallel with each other. The ability to expand the number of channels allows the use of the same digital circuit blocks to be used for both simple one channel sequencing and multiple parallel channel receivers. Block 30 may be replicated to track more than two satellites. Each replication of block 30 will increase the number of channels by two. So for a four channel system two replications of block 30 are required. A single A/D converter is employed. Additional correlators and computers, block 30, may be easily added and simultaneously driven from this single A/D converter. Typically the simple receiver would have two channels that are time shared among four or more satellites. The multiple parallel channel receivers are used to track four or more satellites simultaneously and are required by the more sophisticated applications such as geodetic survey. The high-speed signals 25 are output from an analog to digital (A/D) converter of correlator 24, details are shown in FIG. 3. All of the uncorrelated satellite signals are present at output 23, therefore they are all sampled simultaneously, freeing the receiver from inter-channel biases and the need to duplicate the A/D circuits for each channel.

The decimated outputs on buss 26 include the correlated filtered outputs of the digital signal processing circuits. The filtered signals 26 have a nominal output rate of one kilohertz, a rate sufficiently slow to be further processed by control computer 27.

The control computer 27 further processes signals 26 to derive the necessary control signals 28 and calculate the pseudo-range and integrated carrier phase measurements. The broadcast satellite data is also recovered in the process. Both are output on buss 29 to navigation computer 150. Because of the slow output rate, the control computer can be a low cost microprocessor such as the MC68HC11 with related memory. Computer 27 outputs control signals 28 to block 24. Control computer 27 also has an additional input/output buss 29 which transfers the receiver measured data to the navigation computer 150. Use of a more sophisticated microprocessor, such as the MC68331, would allow use of a single computer to perform both the control and navigation functions for a number of channels.

FIG. 2 shows the antenna output terminals connected to a pre-filter 31. In the present implementation, the filter is a band pass filter that provides out of band rejection to signals received by the antenna. In the present implementation, this filter is miniaturized and has a nominal band width of 50 MHZ. The filter output terminals 32 are connected to a low noise amplifier 33. In the preferred implementation, amplifier 33 is a monolithic microwave integrated circuit (MMIC) having a minimum gain of 22 DB and has its output 34 connected to a second miniaturized filter 35 that provides additional rejection of out of band signals and rejects signals at the first image frequency. In the present embodiment, the Image (bandpass) filter 35 has an output 36 which is connected to L-band amplifiers 37, an RF integrated circuit (RFIC). L-band input 36 is connected to amplifiers 37. In the present embodiment, this amplifier provides a nominal 23 DB of gain to the received satellite signals. Amplifier output 39 is connected to block 40 containing a first mixer 63 and intermediate frequency (IF) amplifier 64 which together provide up to an additional 32 DB of gain. The first local oscillator (LO) injection frequency is provided on lead 42 to first mixer 63 by L-band voltage controlled oscillator (VCO) 70. The mixer output 43 is connected to a first IF filter 44. First IF filter 44 has an output 45 which is connected to the first IF amplifier 64. The gain of amplifier 64 may be adjusted via lead 46 via the GAIN ADJ. lead. First IF amplifier 64 operates at a nominal frequency of 47.76 MHZ with output 47 connected to block 48 which contains the second mixer 65 and the second IF amplifier 67. The second LO injection frequency is supplied to second mixer 65 by Prescaler 50 via lead 49. In the present embodiment of the invention, this second LO frequency is a nominal 38.1915 MHZ. The frequency of the signal on output 66 of second mixer 65 will be the difference between the signal frequencies on leads 47 and 49. The signal on lead 66 is amplified by second IF amplifier 67 and then connected to a second IF filter 52 via lead 51. Filter 52 is an anti-aliasing filter which further rejects out of band signals prior to being digitized by block 24, the digital correlator decimator FIG. 1. Note that the nominal output frequency of second IF amplifier 67 is approximately one forth of the sampling frequency appearing on lead 53, providing a simple means of obtaining the "I" and "Q" signals as explained in the detailed discussion of FIG. 3.

All of the LO injection frequencies are derived from the L-band voltage controlled oscillator (VCO) 70. The signal on lead 42 is the output of oscillator 41. The frequency of output 42 is divided by prescaler 50. Prescaler 50 is a high-speed digital frequency divider that provides the second mixer LO signal on lead 49. Translator 68 buffers and level shifts the signal on lead 49 to establish logic levels on the TTL output lead 53 suitable for driving the timing circuits of block 24 of FIG. 1. The signal on lead 49 is also used to drive the second digital divider 54 that provides a signal on lead 56 that is one half the frequency of that on lead 49. During normal operation the phase and frequency on lead 56 will be equal to that of stable oscillator 55. Output 56 of digital divider 54 and output 57 of stable oscillator 55 are connected to phase-frequency detector 58. The element 58 comprises a combined digital phase-frequency detector (PFD) that may be similar to that of integrated circuit MC12540. The output of PFD 58 in combination with loop filter 59 provide a frequency and phase correcting control voltage to the aforesaid VCO 70 to lock its frequency and phase, as scaled by digital frequency dividers 50 and 54, to that of stable oscillator 55 thus causing the oscillator 41 to generate a frequency that is precisely 80 times that of stable oscillator 55. Those skilled in the art will recognize that the combination of the VCO 70, the first digital frequency divider 50, the second digital frequency divider 54, the phase-frequency detector 58, the loop filter 59 including the off chip capacitor 61, and the stable oscillator 55 form a phase lock loop 69 that is simple and for the most part uses elements that can be fabricated with silicon integrated circuit technology. One knowledgeable in the design of voltage controlled oscillators will appreciate the inclusion of voltage regulator 62 used to regulate and filter the voltage applied to VCO 70. Phase locked loop 69 is fixed frequency and is required to generate only a first LO frequency 42, a second LO frequency 49 and a frequency 56 equal to the stable oscillator frequency 57.

All other frequencies used by the digital correlator decimator are derived from output 53 of translator 68 by simple digital frequency division. Hence, the result is a simple low cost frequency synthesizer implementation suitable for inclusion in a highly integrated GPS receiver.

FIG. 3 is a diagram of a single satellite signal channel in the digital correlator decimator 24 which shows down converter output 23 going to one-bit analog to digital converter (A/D) 71 which quantizes the signals on lead 23 to either a "one" or "zero" depending on the polarity of the input signals. Each correlator 24 includes two such circuits to provide the 2 channels. Quantization is done at the sample rate determined by the frequency of the signal on lead 53 originating from level translator 68. In the present implementation, this frequency is nominally 38.1915 MHZ. The quantized signals are output on lead 72 to the I/Q Select block 73. Blocks 73, 77, and 78 function together as a quadrature mixer which takes the sampled signals on lead 72 and generates in-phase "I" and quadrature "Q" signals while finally down converting the signals to a near zero frequency. Recalling that the signals on lead 23 are at approximately one fourth the sampling frequency on lead 53, operation of the circuit can be briefly explained by considering what is normally done to generate quadrature signals. Mathematically the signal is multiplied separately by the sine and cosine of the local oscillator signal. In a digital implementation, discrete sample times are used, the sample time can be thought of as occurring at the 90 degree points of the LO signals, that is at the peaks and zero crossings of the sine and cosine waves. The multiplications required are then simplified so that only one bit is required. Further recalling that when the cosine wave is at its positive or negative peak, the sine wave is at zero and when the sine wave is at its positive or negative peak the cosine wave is at its zero, then the required multiplication sequence is +1, 0, −1,0 for the cosine wave and 0, +1, 0, −1 for the sine wave. The digital processing illustrated by blocks 73, 77, and 78 is one implementation of the procedure and is described in the following paragraph.

The function of block 73 is to take the incoming samples on lead 72 and alternately switch them between lead 74 and 75 in synchronism with the sample rate. This procedure results in the "I" samples leading the "Q" samples by a clock period. In addition to the selection of the "I" and "Q" signal samples, block 73 aligns the "I" and "Q" outputs in time by delaying the "I" signals such that they are coincident with the "Q" signals after which they are applied to inputs of exclusive or "XOR" blocks 77 and 78 respectively. The output rate on leads 74 and 75 is nominally 19.09575 MHZ, half of the sample rate. The clock signals for the channel cell are derived from the level translated clock signal on lead 53. It is used directly to clock A/D converter 71 and is divided by two by digital divider 79 to obtain a nominal 19.09575 MHZ signal, lead 80, used to drive I/Q selector 73 and a second digital frequency divider 81. The output of block 81 is a timing signal that is one fourth the frequency of that on lead 53. Lead 76 is the output of block 81 and is applied to XOR gates 77 and 78 causing the signals on leads 74 and 75 to be alternately inverted then non-inverted at outputs 82 and 83 effectively multiplying the signals on 74 and 75 by either plus or minus one. Remembering the input signals on lead 23 are at a nominal frequency of 9.5685 MHZ and the nominal frequency on lead 76 is 9.547875 MHZ, one skilled in the art will realize that the signals are digitally converted to a near zero difference frequency that is nominally 20,625 HZ and further realize that the signals on lead 82 will be 90 degrees out of phase with those on lead 83. Block 73 could be constructed from readily available logic blocks such as "D" flip flops and an inverter.

The signals on leads 82 and 83 are coupled into complex phase detector 84. Complex phase detector 84 is a one-bit digital implementation of a single side band phase comparator. The complex signal inputs are on leads 82 and 83 while the complex reference frequency inputs are on leads 86 and 87, that is the one-bit cosine and sine outputs from numerically controlled oscillator (NCO) 113. The phase detector, block 84, output is the cosine of the difference between the frequencies of the complex inputs. An analog equivalent would have only a single output, however, the digital version which can only output "ones" and "zeros" needs a second output to indicate polarity. The magnitude is shown on lead 88 and the sign on lead 89. The second complex phase detector 85 performs the same function as 84 except that the connections 86 and 87 are arranged to produce the sine of the frequency difference with the magnitude on lead 94 and the sign on lead 117. In normal operation while tracking a satellite signal, the signal frequency on leads 82 and 83 and that of NCO 113 are the same so the average output from block 84 is a measure of the cosine of the phase angle difference between the down converted satellite signals and the NCO, block 113 also receives the average output of block 85 is a measure of the sine of this phase angle. One skilled in the art will recognize that this type of phase detector could be constructed from common logic blocks such as XOR gates and inverters.

The processing described up to this point has not yet demodulated the pseudo random noise (PN) code from the received signal. PN code modulation is the GPS system feature that allows separation of one satellite signal from the other. This is sometimes referred to as code division multiple access (TDMA). In addition, it provides a way of making pseudo range measurements. The demodulation process is the reverse of the modulation process used by the satellite. At the satellite, modulation is applied to the carrier by a process that can be described mathematically multiplying the carrier by either a plus or minus one depending on the state of the modulating PN code generator output. The demodulation process is accomplished in the GPS receiver by generating a code that is identical to that used by the satellite and providing a method for changing its position relative to the receiver clock via a control loop. In the present implementation, the codes are generated by block 102. A code matching the satellite to be tracked is selected via the code control buss 28 which is connected to PN code generator 102. PN code generator 102 is clocked via lead 101. Code clock generator 100 nominally divides by 3/112 in order to obtain a nominal 1.023 MHZ CA code clock. In order to correlate the code on the selected satellite signal, it is necessary for the phase of the code clock, lead 101 to be adjustable to allow time synchronization/alignment of the received code, whose time of arrival is variable, and the code generated by block 102. In the present implementation the code phase is adjusted by the control computer 27 via buss 28.

The PN code generator 102 in FIG. 3 has four outputs, leads 103, 104, 105, and 106, their purposes are discussed below. Lead 103 is referred to as the prompt (on time) code. Lead 104 is referred to as the "late" code, it is the same as prompt code 103 except it is delayed by one half of the code clock period on lead 101. An "early" code, internal to block 102, is the same as that of the prompt code except it occurs one half of a code clock cycle ahead of the prompt code. In other words, the early and late codes are one clock code clock cycle ("one chip") apart and the prompt code is, ideally, half way between them. The early and late codes are differenced with the magnitude of the difference appearing on lead 105. The sign of the difference is on lead 104, the "late" code can be used to determine the sign. Magnitude 105 and sign 104 are applied to code discriminator 118. When tracking a satellite, prompt code 103 is in time alignment with the selected satellite signals appearing on lead 88, 89, 94, and 117. Prompt signal 103 is connected to the code inputs of prompt correlator, XOR gates 90 and 91. The polarity bits from phase detectors 84 and 85 are connected to the signal inputs of blocks 90 and 91 via leads 89 and 117. Those skilled in the art will recognize that XOR gates 90 and 91 provide a simple means for multiplying signals 89 and 117 by plus or minus 1 as determined by the prompt code on lead 103. When the prompt code and that modulated on the received signal are time aligned, code correlation occurs, thus demodulating the PN code from the carrier despreading the signal. The correlated outputs, leads 92 and 93 are used to determine the polarity (sign) of signal magnitudes on leads 88 and 94.

In order to maintain code alignment, a method for determining the degree of time miss-alignment is required. This is accomplished by using the previously described signals on leads 117, 94, 104, and 105 in conjunction with gates 108 and 109 of code discriminator 118. The output of logical "AND" gate 108 is the magnitude of the code position error and the output of XOR gate 109 is its polarity. The technique of subtracting the early and late codes prior to code discriminator correlation has been described by R. A. Yost and R. W. Boyd in the "IEEE Transactions on Communications", VOL. COM-30, No. 5, May 1982. One skilled in the art will recognize that using this approach eliminates the need for separate carrier phase detectors and the need for individual integrate and dump circuits for both the early and late codes in order to implement the code discriminator function.

The code epoch pulses that occur during the time when all of the code states are logical "ones" are available on lead 106. The PN codes used by the GPS satellites are defined in the Department of Defense Global Positioning System interface control documents such as "Navstar GPS Space Segment/ Navigation User Interfaces, ICD-GPS- 200.

Although the signal frequency has been translated to zero and the signal despread by the phase detection and correlation process described in the paragraphs above, in order to distinguish the signal from the noise, additional filtering or integration is required. In the present implementation, this is accomplished for the prompt "I" and "Q" signals and the code discriminator, by integrate and dump circuits 95 and 96. The polarity bits on leads 92, 93 and 111 determine whether their respective integrators are incremented up or down whenever the magnitude is a "one". The integration process continues for a code period, nominally 1 millisecond, at which time the quantity in each integrator is read by the control computer 27. Then integrators 95, 96, and 112 are reset to zero by the code epoch pulses on lead 106. Since the signal inputs 88, 94, and 110 are still one-bit wide, the integrate and dump circuits could be implemented with up/down counters. The input rate to integrators 95, 96, and 112 is one half of the frequency Fs on lead 53 and the output rate is nominally 1 KHZ, a frequency low enough to be further processed by control computer 27.

Frequency generator 107 further divides the timing signals on lead 76 to provide a clocking signal for NCO 113 and a timing/interrupt signal, lead 114, for the control computer. In the present implementation, the signals on leads 115 and 114 are at nominal frequencies of 217 KHZ and 1 KHZ respectively.

Numerically controlled oscillator 113 provides an output frequency that is a function of a digital frequency word from control computer 27. In the present implementation, the frequency word is supplied by the control computer 27 via leads 26, 28. The operation of an NCO is described by J. Tierney, et al in the "IEEE Transactions On Audio and Electroacoustics"; Vol. ,AU-19, No. 1; Mar., 1971. In the present NCO implementation (block 113), one-bit approximations of the sine and cosine functions are used rather than the multibit digital to analog conversion described in the referenced paper. These one-bit outputs are available on leads 86 and 87. One skilled in the art will recognize that the use of one-bit outputs greatly simplifies the design of the NCO and the multiplication processes as explained in the discussion of phase detectors 84 and 85. Also use of a 24 bit NCO clocked at 217 KHZ provides a frequency resolution of 0.013 HZ. Implementing the basic NCO in the manner described herein can be easily accomplished using available integrated circuit technology. In addition to controlling the frequency of NCO 113, additional digital interfaces are provided to preset the NCO phase via buss 26, 28 and to read an integral number of cycles plus a fractional part. The blocks that interface with the control computer all contain address decoders, function select, and data latches as required for a given interface.

As can be seen from the above description, the present GPS digital receiver may be implemented with inexpensive parts and does not require high precision oscillators. Thus, this receiver is suitable for low-cost, high production GPS digital receivers.

Figure 4:
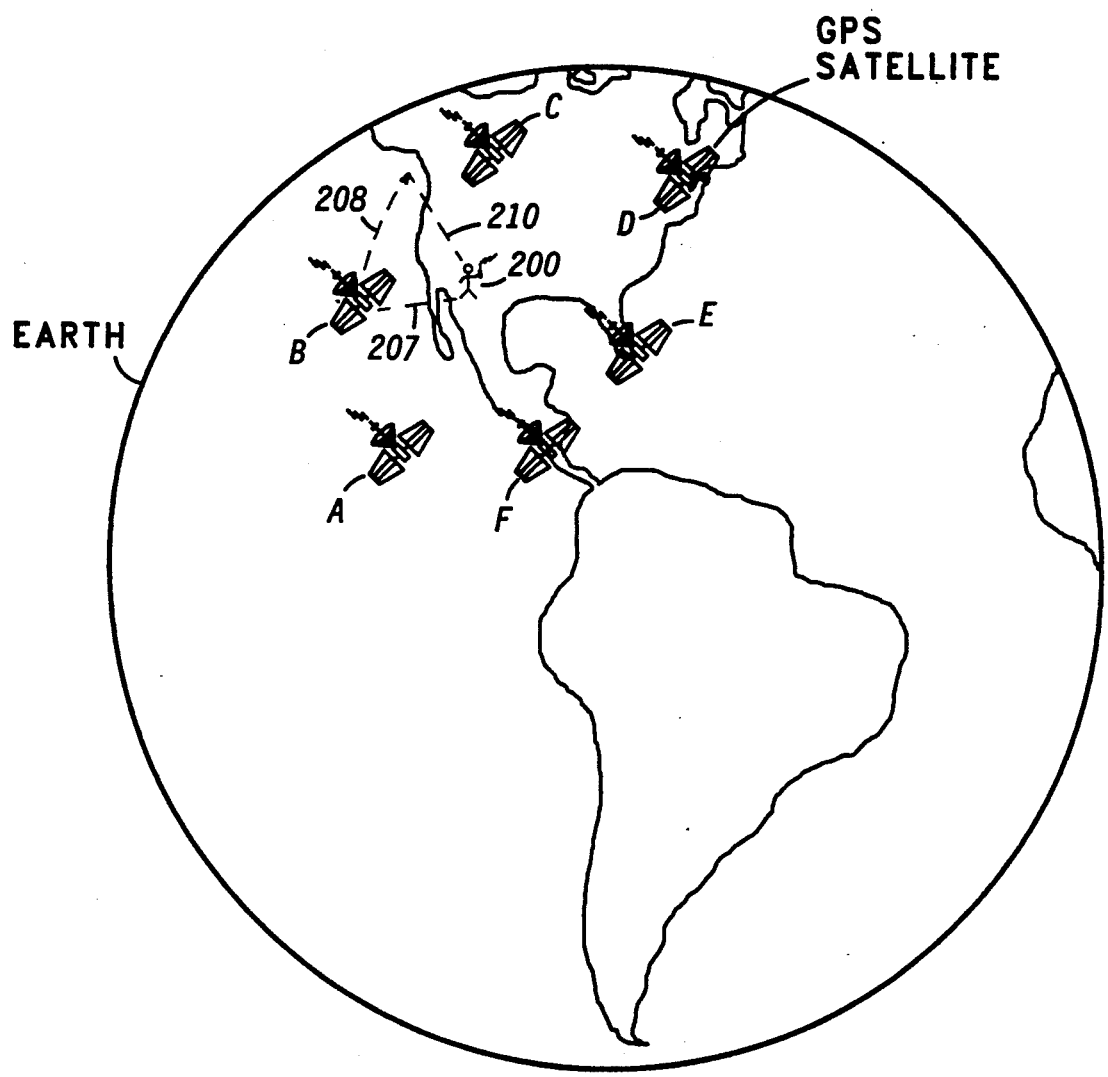
FIG. 4 is a diagram of Global Positioning System (GPS) satellites in relation to a user in accordance with the present invention.

Referring to FIG. 4, a diagram of a GPS satellite configuration about the Earth is shown. User 200 is holding a GPS receiver in accordance with the present invention. This GPS receiver is a two channel receiver which tracks six GPS satellites A through F. These satellites must all be within line of sight of user 200.

Since only two channels are available to track satellites A–F, the two channels must be time shared among six satellites. In the present invention, one channel tracks a particular satellite for a thirty second interval. The second channel tracks the other five satellites on a time multiplexed sequenced basis. After 30 seconds of tracking satellite A on the first channel and satellites B–F on the second sequenced channel, the first channel then tracks satellite B continuously for the next 30 seconds and the second channel tracks satellites A and C–F on a sequenced basis. On the following 30 second tracking cycle, the first channel tracks satellite C and the second channel tracks satellites A, B and D–F, etc.

Thus the second channel tracks each satellite for 200 ms., then tracks each of the other four satellites before returning to track the first of the five GPS satellites. There is 800 ms. from the end of the measurement of a given sequenced satellite signal to the time the same satellite signal is re-acquired. Further, the more accurate the tracking information the more accurately the position of user 200 may be determined.

Satellite A is tracked by the first channel of the GPS receiver. Satellites B through F are tracked by the second channel of the GPS receiver. Satellite B is the first of the five satellites which the second channel tracks on a time multiplexed basis. As shown in FIG. 4 satellite B is at a distance 207 from user 200 for one tracking cycle. As the other satellites C–F are tracked for 800 ms. satellite B moves relative to user 200 along path 208. When the second channel returns to track satellite B, the satellite's position with respect to user 200 is at a distance 210 from user 200. The channel must rapidly synchronize to satellite B in order to gather position location information. Therefore, the new position of satellite B and the Doppler effect must be estimated in order to allow the rapid synchronization for the GPS receiver second channel to receive accurate position location information so that the user's 200 position may be accurately determined.

Figure 5:
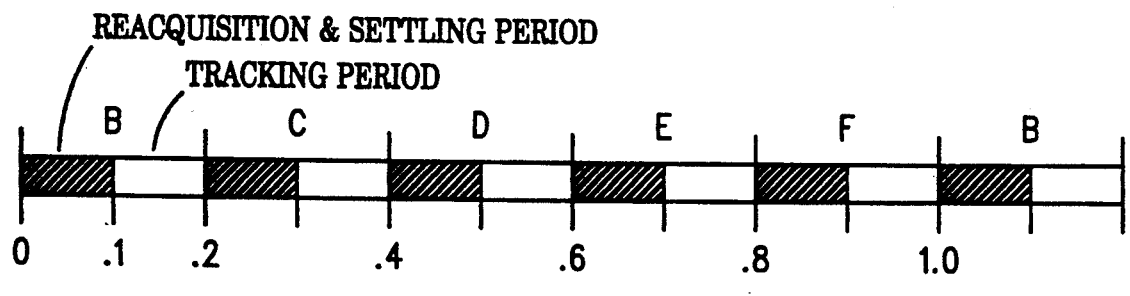
FIG. 5 is a diagram depicting the sequencing of GPS satellites by the GPS receiver in accordance with the present invention.

The tracking sequence of the second channel for satellites B–F is shown in FIG. 5. The total tracking interval for satellites B–F is one second. At time 0 the second channel begins tracking satellite B for 200 ms. For the first 100 ms (cross hatched) of the 200 ms. tracking time of each satellite is required for re-acquisition and settling of the circuitry of the channel shown above. The actual time of tracking each satellite is approximately 100 ms. As an example the frequency including Doppler for the next cycle of tracking for satellite B is determined during the time that the other satellites C–F are being tracked as a background task by control computer 27 as shown in FIG. 3.

Figure 6:
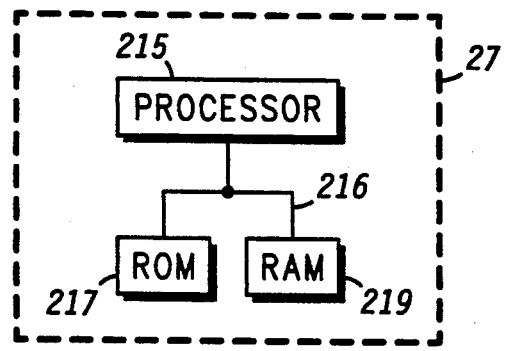
FIG. 6 is a block diagram of a portion of the control computer of FIG. 3.

FIG. 6 shows a portion of the details of control computer 27 of FIG. 3. Control computer 27 includes processor 215, ROM memory 217 and RAM memory 219. Processor 215 is connected to ROM memory 217 and to RAM memory 219 via data/address/control buss 216. ROM memory 217 stores the operating programs for the present GPS receiver to determine its position, velocity and time from tracking the GPS satellites. RAM memory 219 stores the dynamic data necessary for the GPS receiver to retain past location information for each satellite necessary for the GPS receiver to determine the future position of each satellite for rapid re-acquisition of each satellite's position information. The operating programs stored in ROM 217 shall be explained infra in detail.

Figure 7:
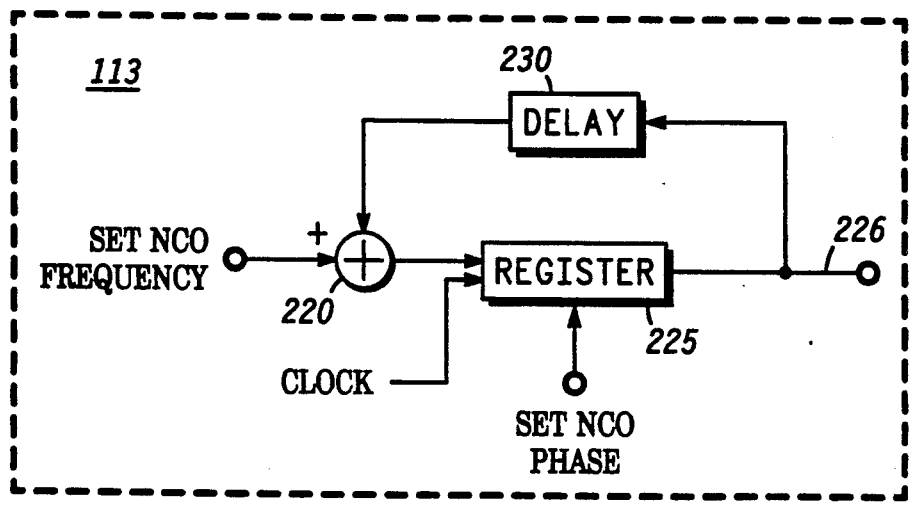
FIG. 7 is a block diagram of a portion of the numerically controlled oscillator of FIG. 3.

Referring to FIG. 7, a block diagram of a portion of the numerically controlled oscillator 113 is shown. Inputs to the NCO 113 include the set NCO frequency input and the set NCO phase input. The control computer 27 is connected to adder 220 via the set NCO frequency lead. The control computer is connected to shift register 225 via the set NCO phase lead. Adder 220 is connected to register 225. Register 225 has clock inputs. The output of shift register 225 is connected to adder 220 via delay element 230. Delay element 230 is shown for clarity. The quantity residing in register 225 is fetched at the next clock cycle. It is then added by adder 220 to the number applied to the set NCO frequency lead with the result being stored back in register 225. The delay of delay element 230 is effectively one clock cycle in duration. Whenever register 225 overflows, the quantity that is stored in register 225 at the end of the addition period is the amount in excess of that required to cause the overflow. It will be understood by those of ordinary skill in the art that the required interface circuits to allow performance of the necessary read/write to the NCO. It is also understood that a counter to count the number of overflows that occur during a measurement period may be included.

As the sequencing channel tracks one satellite and another, the NCO 113 must be set with the frequency and phase for the expected (estimated) new position of the particular satellite. The estimated frequency and phase of the NCO are determined by the control computer 27 and transmitted to NCO 113. The NCO frequency is the expected frequency at which the particular satellite's information is received including the proper Doppler adjustment for the satellite's movement relative to the GPS receiver. The NCO phase is the fractional part of the frequency cycle which is transmitted to register 225 by control computer 27. This fractional part of the cycle is the count of register 225. The register 225 can store a number up to 2 to the twenty-fourth power, and thus provides an arrangement for determining changes in slant range to a fraction of the carrier wavelength and therefore aids in accurately determining the pseudorange of each satellite. Each time register 225 overflows, a count is produced on lead 226. The accuracy of the count on lead 226 provides the processor 215 with the number of internal carrier cycles and the phase represented by the number in register 225, the fractional part. This information significantly increases the accuracy of the pseudorange measurement for the satellite which is being tracked. The more accurate the NCO frequency and phase are the more accurate the tracking of each satellite is and the position of the GPS receiver may be more accurately determined.

Figure 8:
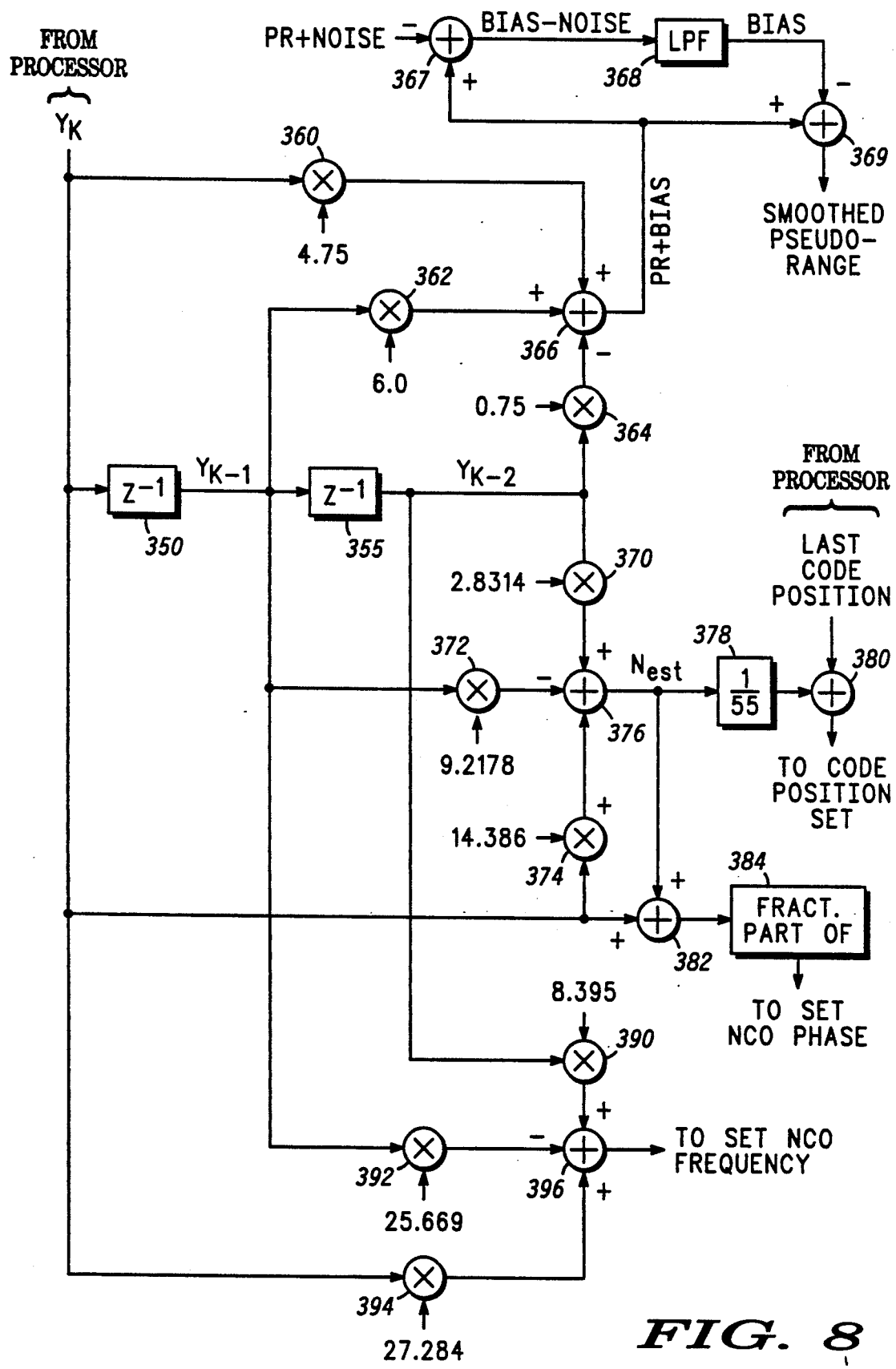
FIG. 8 is a block diagram of a portion of the range estimation apparatus in accordance with the present invention.

Referring to FIG. 8, a block diagram of a portion of pseudorange estimation is shown. The integrated carrier phase can be plotted as a two dimensional curve. The space between points on the curve represent the skipped integrated carrier phase. The interval between points is the dwell to tracking time ratio. The curve described by these points will have a minimum at the point of closest approach and will increase as the satellites move away from the point of closest approach. This suggests that a second order curve would closely approximate for short segments between measurement and that a linear approximation may suffice. This approximation may be given by equation (1).

$$N_k = 9(y_k - y_{k-1})/2 \tag{1}$$

For a second order approximation, the curve can be represented by equation (2).

$$y = at^2 + vt + c \qquad (2)$$

Integrating equation (2) over a time interval of T to 2T, results with equations (3a and 3b).

$$P_r = 6y_{k-1} + 4.75y_k - 0.75y_{k-2} \qquad (3a)$$

or in a more general form:

$$P_r = \left(\frac{5T}{12} + 1\right)y_k + \left(\frac{2T}{2}\right)y_{k-1} - \left(\frac{T}{12}\right)y_{k-2} \qquad (3b)$$

In order to estimate the NCO's 113 frequency setting for the next tracking cycle, equations (4a and 4b) provide an estimate.

$$N_{est} = 9(0.3146 y_{k-2} - 1.0242 y_{k-1} + 1.5985 y_k) \qquad (4a)$$

or in a more general form:

$$N_{est} = T\left[y_k\left(\frac{B^3}{6} - \frac{B^2}{4} - \frac{1}{3}\right) - y_{k-1}\left(\frac{B^3}{3} - B^2 + \frac{4}{3}\right) + y_{k-2}\left(\frac{B^3}{6} - \frac{3B^2}{4} - \frac{1}{3}\right)\right] \qquad (4b)$$

Where T = the skipped interval divided by the measurement interval; and B = (3 times the skipped interval minus the settling interval)/the measured interval. In the present implementation both the measurement interval and settling interval are 0.1 seconds. Using these values T = 9 and B = 26T/9.

The NCO frequency can be given by equations (5a and 5b) as follows.

$$y_{est} = 0.8395 y_{k-2} - 2.5679 y_{k-1} + 2.7284 y_k \qquad (5a)$$

or in a more general form:

$$y_{est} = y_k\left(\frac{B^2}{2} - \frac{B}{2}\right) - y_{k-1}(B^2 - 2B) + y_{k-2}\left(\frac{B^2}{2} - \frac{3B}{2} + 1\right) \qquad (5b)$$

FIG. 8 depicts an embodiment of the estimation process for determining pseudorange, code position, NCO phase and NCO frequency in accordance with the present invention. The symbol $Z^{-1}$ represents the function of obtaining the value of the corresponding input from one cycle prior to the input signal. For example, $Y_K$ is the input to block 350 which has the function $Z^{-1}$. Block 350 obtains from memory 219 the cycle count for the previous cycle for this satellite. Input $Y_{k-1}$ to block 355 which includes function $Z^{-1}$ indicates that with respect to the input which is from one cycle previous the cycle count for two cycles previous is to be output by block 355.

Input $Y_k$ (the present cycle count) is transmitted to multipliers 360, 374 and 394 and to adder 382. The cycle count from the previous cycle is transmitted from block 350 to multipliers 362, 372 and 392. The cycle count from two cycles ago $Y_{k-2}$ is transmitted from block 355 to multipliers 364, 370 and 390. Multiplier 360 multiplies the current cycle count by the constant 4.75 and transmits the result to adder 366. Multiplier 362 multiplies the previous cycle count by 6.0 and transmits the result to adder 366. Multiplier 364 multiplies the cycle count from 2 cycles ago by the constant 0.75; takes the negative of the result and transmits the negative result to adder 366. Adder 366 performs the addition of the three results and passes it to the pseudorange smoothing circuitry.

The pseudorange smoothing circuitry includes adder 367, low pass filter 368 and adder 369. The Pr+Bias signal is transmitted from adder 366 to adder 367. The Pr+Noise signal is obtained from code generator 102 and is negated and input to adder 367. The output of adder 367 is the Bias-Noise signal. The Bias-Noise signal is low pass filtered by low pass filter 368 to produce the Bias signal only. The Bias signal is then negated and added with the Pr+Bias signal by adder 369. The resultant output of adder 369 is the smoothed pseudorange signal which is transmitted to the navigation computer 150.

Multiplier 374 multiplies the current cycle count by 14.386 and transmits the result to adder 376. Multiplier 372 multiplies the previous cycle count by 9.2178 and negates the result and transmits the result to adder 376. Multiplier 370 multiples the cycle count from 2 cycles ago by by 2.8314 and transmits the result to adder 376. Adder 376 sums the three results and produces the cycle count estimate, $N_{est}$ which is transmitted to adder 382 and to divide by 55 circuit 378. Divide by 55 circuit 378 transmits its output to adder 380. The last code position of the code epochs is retrieved from memory and input to adder 380. The output is the estimated code position setting for the next scan of this satellite and it is transmitted to code generator 102.

The present cycle count is transmitted to adder 382. Adder 382 adds the cycle count estimate $N_{est}$ with the current cycle count and transmits the result to block 384. Block 384 removes the fractional part only of the sum and transmits it to the NCO 113 as the estimated NCO phase for this satellite.

Multiplier 394 multiplies the current cycle count by 27.284 and transmits the result to adder 396. Multiplier 392 multiplies the previous cycle count by 25.669; negates the result and transmits the negated result to adder 396. Multiplier 390 multiplies the cycle count from 2 cycles ago by 8.395 and transmits the result to adder 396. Adder 396 sums the three results and transmits its output to NCO 113 as the estimated NCO frequency of this satellite.

Figure 9:
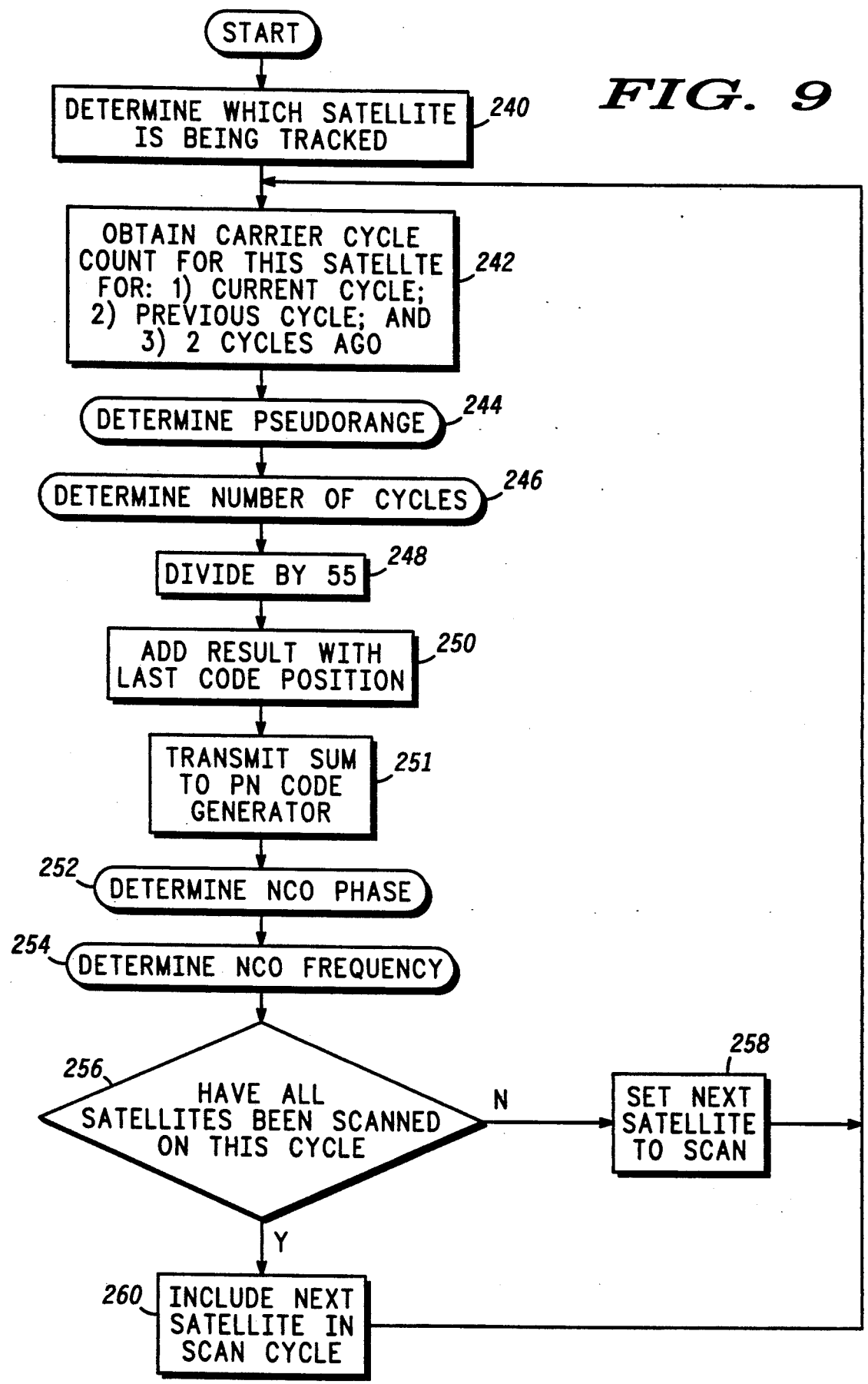
FIG. 9 is a flow chart of the range determination process for a GPS receiver in accordance with the present invention.

FIG. 9 depicts another embodiment of the estimation process for determining pseudorange, code position, NCO phase and NCO frequency in accordance with the present invention. The process is started and block 240 is entered. Block 240 determines which is presently being tracked by the channel that is sequencing a number of channels. For example, in the channel which is tracking five satellites (B-F) on a sequenced basis, the identity of the present satellite which is being tracked is determined. Next the carrier cycle counts for the present cycle, the last cycle and two cycles ago are obtained. These counts for previous cycles have been previously stored in RAM memory 219 thereby changing the state of memory 219.

Figure 10:
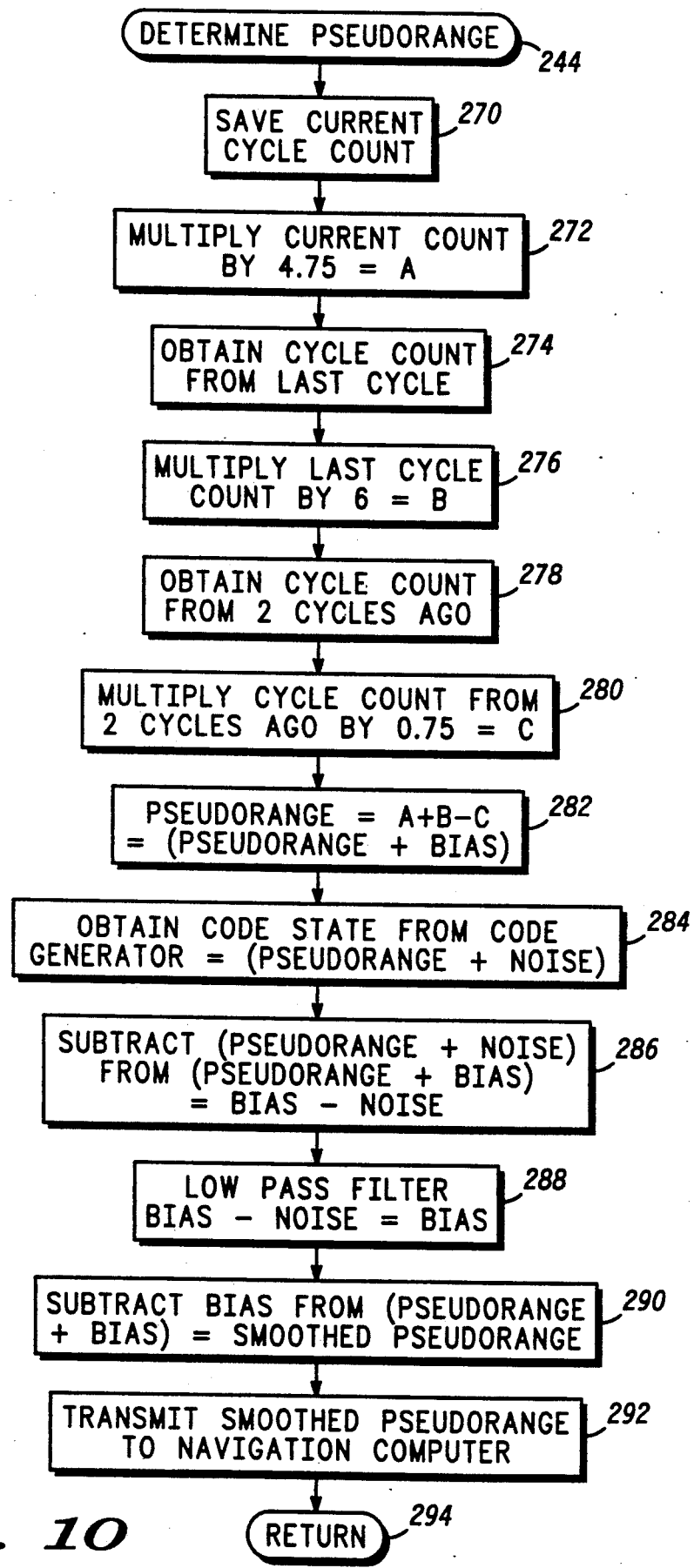
FIG. 10 is a flow chart of the determine pseudo range process in accordance with the present invention.

Then the determine pseudo range subprogram is invoked, block 244. Referring to FIG. 10, control by processor 215 is transferred to the determine pseudorange subprogram is entered and block 270 is initiated. Block 270 saves the current cycle count for the particular satellite in RAM memory 219, thereby changing the state of memory 219. The current cycle count will be used on subsequent cycle in the pseudorange determination process. The current cycle count is multiplied by 4.75 and stored in memory 219 at location A, block 272. The cycle count from the last cycle is obtained from memory, block 274. The previous cycle count is multiplied by 6 and stored in memory 219 at location B changing its state, block 276. Next, the cycle count from 2 cycles ago is retrieved from memory 219, block 278. Block 280 multiplies the cycle count from 2 cycles ago by 0.75 and stores the result in memory 219 at location C. The pseudorange+bias is then determined by adding locations A and B and subtracting location C, block 282.

Block 284 obtains the code state for this satellite from code generator 102, block 284. This code state is the pseudorange+noise associated with this satellite's transmission. The pseudorange+noise is subtracted from the pseudorange+bias to obtain a signal representing the bias−noise, block 286. The bias−noise signal is then low pass filtered to obtain a signal representing just the bias, block 288. Block 290 then subtracts the bias signal from the pseudorange+bias signal to obtain the smoothed pseudo range signal to accurately represent the range of the GPS receiver to the particular satellite. The smoothed pseudorange is transmitted to navigation computer 150 to aid in the position, location and satellite tracking process, block 292. Return of control is made to the main program, block 294.

Figure 11:
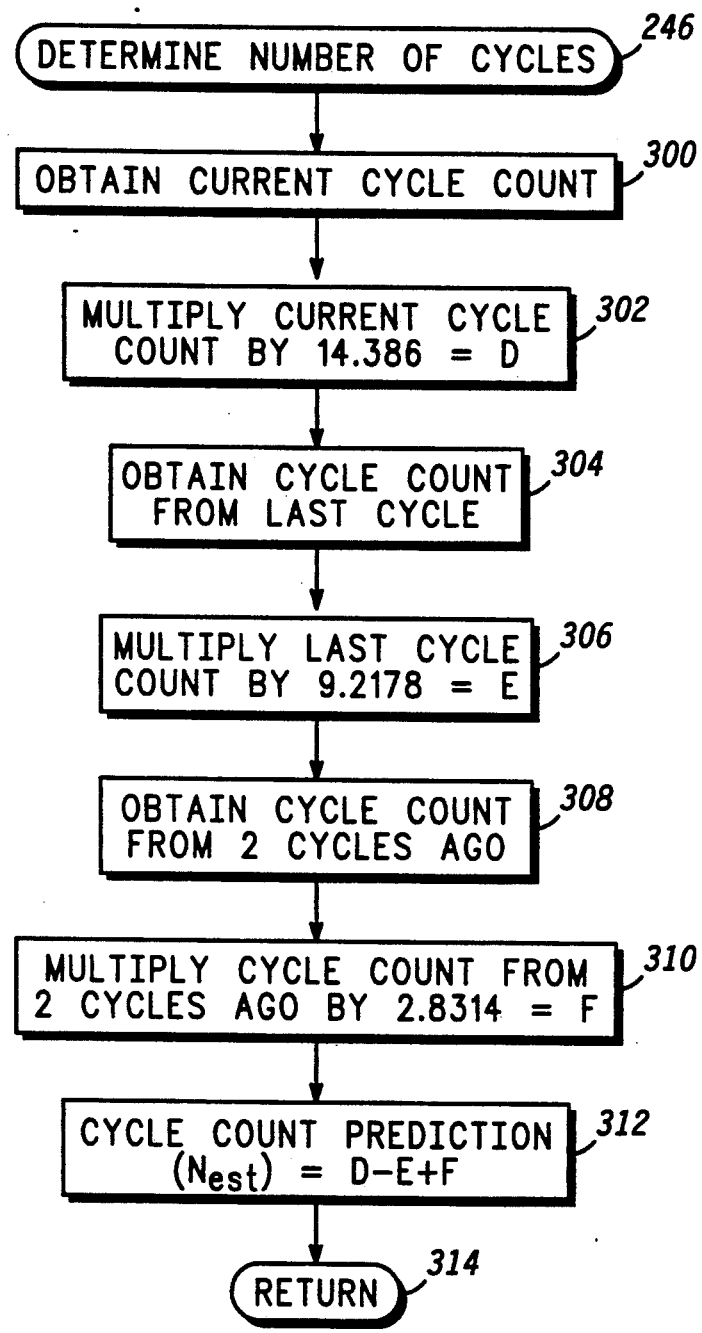
FIG. 11 is a flow chart of the determine the number of cycles process in accordance with the present invention.

Referring again to FIG. 9, the main program then transfers control to the determine the number of cycles subprogram, block 246. FIG. 11 depicts the determine the number of cycles for the expected position of the satellite being tracked, block 246. Block 300 obtains the current cycle count for the particular satellite from memory 219. Under control of the control computer 27, this subprogram multiplies the current cycle count by 14.386 and stores the result in memory 219 at location D thereby changing the state of memory 219, block 302. Next block 304 obtains the cycle count from the last cycle. This cycle count was previously stored in memory 219. The last cycle count is multiplied by 9.2178 and stored in memory 219 at location E thereby changing the state of memory 219, block 306. The cycle count from 2 cycles ago is obtained from memory 219, block 308. Block 310 then multiplies the cycle count from 2 cycles ago by 2.8314 and stores the result at location F in memory 219 thereby changing the state of memory 219. The cycle count prediction for this satellite for the next cycle is determined by adding the contents of locations D and E of memory 219 and subtracting the contents of location F. Control is then returned to the main program, block 314.

Referring again to FIG. 9, block 248 divides the cycle count prediction by 55. The result of this division is added with the previous code position, previously stored in memory 219, block 250, to produce an estimated code position of where the satellite presently is in the transmission of the code epochs. The result of the addition is then transmitted to the PN code generator 102, block 251.

Figure 12:
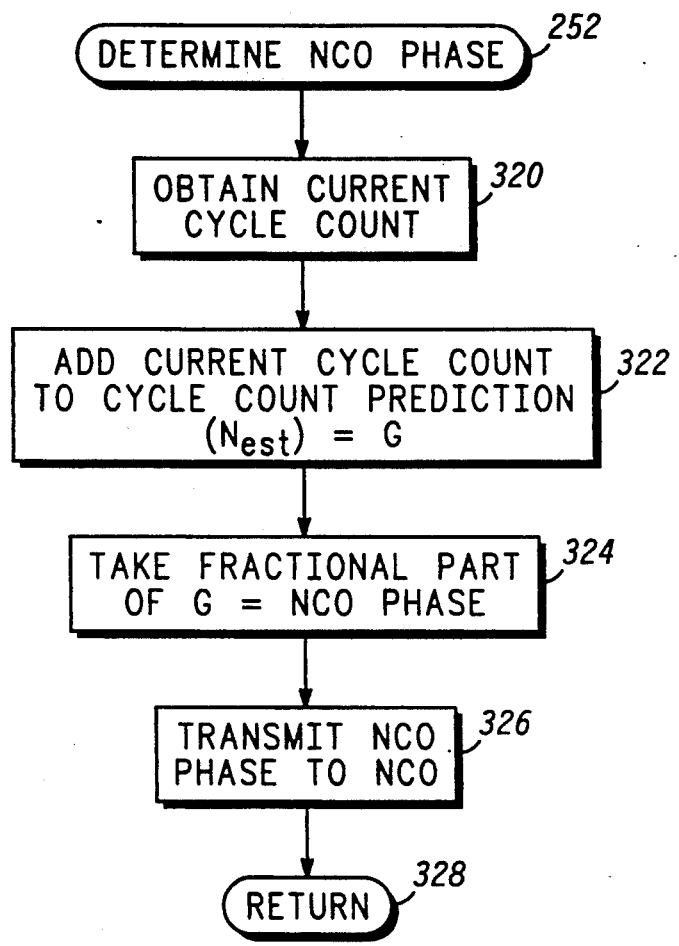
FIG. 12 is a flow chart of the determine numerically controlled oscillator phase process in accordance with the present invention.

Next, the main program depicted in FIG. 9 transfers control to the determine NCO phase subprogram, block 252. The determine NCO phase subprogram is entered, block, 252 as shown in FIG. 12. Block 320 obtains the current cycle count. The cycle count prediction previously determined by the determine number of cycles subprogram 246 is added with the present cycle count and stored in memory 219 at location G, block 322. Next, the fractional part only of the combined cycle count is extracted thereby modifying the state of memory 219, block 324. This fractional part of the combined cycle count represents an estimate of the phase of the satellite's new position for NCO 113. This NCO phase is then transmitted to NCO 113, block 326. The determine NCO phase subprogram then returns control to the main program of FIG. 9, block 328.

Figure 13:
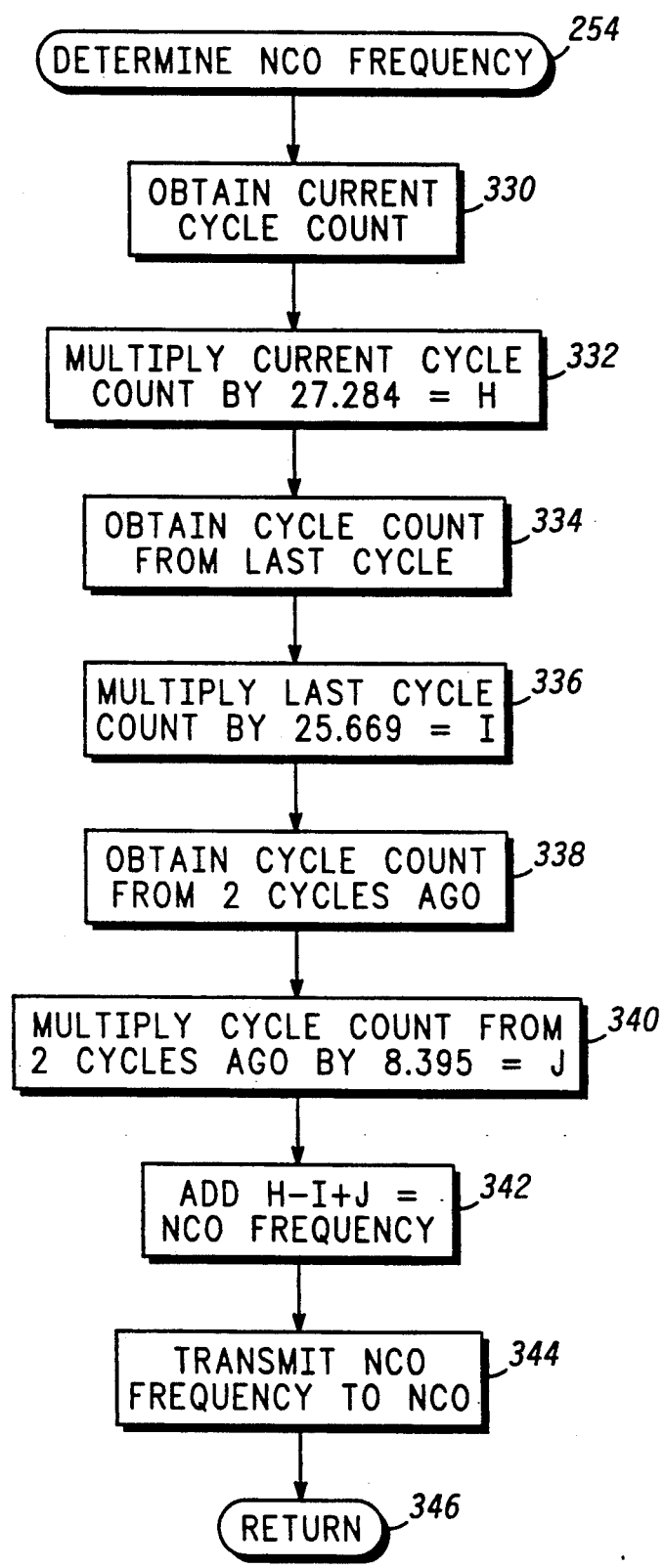
FIG. 13 is a flow chart of the determine numerically controlled oscillator frequency process in accordance with the present invention.

The main program depicted in FIG. 9 must determine the last parameter for rapid lock-up and re-tracking of this satellite. This parameter is the frequency estimate including proper Doppler compensation to which the NCO 113 should be set for this satellite. The main program then transfers control to the determine NCO frequency subprogram, block 254. Referring to FIG. 13 the determine NCO frequency subprogram is depicted, block 254. First, the current cycle count is obtained, block 330. Under control of control computer 27, the determine NCO frequency subprogram then multiplies the current cycle count by 27.284 and stores the result in memory 219 at location H thereby changing the state of the memory, block 332. The cycle count for the last cycle is obtained from memory 219, block 334. The last cycle count is then multiplied by 25.669 and stored in memory 219 at location I thereby changing the state of the memory, block 336. Next the cycle count from 2 cycles ago is obtained from memory 219, block 338. The cycle count from 2 cycles ago is multiplied by 8.395 and the result stored in memory 219 at location J thereby changing the state of the memory, block 340. Next, the contents of memory 219 location I is subtracted from location H and the result added to the contents of location J, block 342. This result is the expected NCO frequency for this satellite which is being re-tracked. The determined frequency is transmitted to NCO 113, block 344. Control is then returned to the main program, block 346.

Referring to FIG. 9 again, control is returned from the determine NCO frequency subprogram to the main program at block 256. Block 256 determines whether all the satellites have been scanned on this cycle. The scan cycle is 1 second long, but is repeated for 30 seconds with one group of satellites before the group of satellites is altered. If all the satellites have not been scanned on this cycle, control is transferred from block 256 to block 258 via the N path. The identity of the next satellite to be scanned is selected, block 258. The above mentioned process is iterated beginning at block 242. If all the satellites have been scanned for 30 seconds, block 256 transfers control to block 260. Block 260 removes one of the satellites from the scan sequence in sequential order and replaces that satellite with the next sequential satellite identity to be included in the sequenced scan by the multiplexed channel. The satellite which is removed from the multiplexed channel is scanned continuously for the next 30 second scan period by the continuous tracking channel. Block 260 then transfers control to block 242 where the above mentioned process is iterated.

Thus a method and apparatus for accurately tracking on a multiplexed basis a number of satellites, for example GPS satellites, has been described. The improvements include determining an estimated pseudorange for each satellite as well as smoothing the pseudorange to allow more accurate determination of the satellite's position for the next scan of the satellites position location information. In addition the present invention estimates the code position setting for rapid lock-up to the satellite's transmitted information and frequency and phase settings for a numerically controlled oscillator. These highly precise estimates allow the GPS receiver to self-locate its position to within a matter of a few feet instead of hundreds of feet.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A shared channel Global Positioning System (GPS) receiver for receiving a plurality of coded satellite signals from a plurality of satellites, said signals exhibiting Doppler shifting, said GPS receiver comprising:
   means for converting said coded satellite signals to intermediate frequency signals;
   A/D means coupled to said means for converting, said A/D means for simultaneously translating said intermediate frequency signals for said plurality of coded satellite signals to a plurality of digital signals;
   correlation means coupled to said A/D means, said correlation means for simultaneously separating each of said plurality of digital signals corresponding to each said satellite to provide channel information signals for each said satellite;
   channel means coupled to said correlation means, said channel means for estimating a plurality of parameters describing each satellite's expected position and an expected frequency of transmission of said coded satellite signals including Doppler compensation for each of said plurality of said satellites on a time division multiplexed basis; and
   processor means coupled to said correlation means and to said channel means, said processor means for retrieving information transmitted from each of said satellites in response to channel information signals.

2. A GPS receiver as claimed in claim 1, wherein said processor means includes:
   processor unit means;
   read only memory (ROM) means coupled to said processor unit means, said ROM means for storing operating programs for execution by said processor unit means; and
   random access memory (RAM) means coupled to said processor unit means, said RAM means for storing dynamically changing data including said plurality of parameters.

3. A GPS receiver as claimed in claim 2, wherein said correlation means includes numerically controlled oscillator (NCO) means coupled to said processor unit means, said numerically controlled oscillator means including:
   adding means coupled to said processor unit means;
   register means coupled to said adding means and to said processor unit means, said register means for storing a plurality of bits representing a phase of the expected satellite frequency; and
   delay means coupled between said register means and said adding means, said delay means for delaying by at least one clock cycle bits output from said register means to said adding means.

4. A GPS receiver as claimed in claim 3, wherein said channel means includes:
   means for determining an estimated pseudorange of each said satellites coupled to said processor unit means;
   means for determining an estimated code positions for each said satellite coupled to said processor unit means;
   means for determining an estimated NCO phase coupled to said processor unit means and to said NCO means; and
   means for determining an estimated NCO frequency for each satellite coupled to said processor unit means and to said NCO means.

5. A GPS receiver as claimed in claim 4, wherein said means for determining said estimated pseudorange includes means for smoothing said estimated pseudorange to remove noise from said estimated pseudorange to produce an accurate pseudorange for accurate position location by said GPS receiver.

6. A GPS receiver as claimed in claim 5, wherein said means for smoothing said estimated pseudorange includes:
   first adder means coupled to said means for determining said estimated pseudorange and to a source of said pseudorange+noise, said first adder means producing a first sum;
   low pass filter means coupled to said adder means, said low pass filter means for removing said noise from said first sum to produce a bias output; and
   second adder means coupled to said low pass filter means and to said means for determining said estimated pseudorange, said second adder means for adding a negative of said bias output with a pseudorange+bias output of said means for determining said estimated pseudorange to produce a smoothed estimated pseudorange.

7. A GPS receiver as claimed in claim 4, wherein said means for determining said pseudorange includes:
   first means for obtaining a present cycle count from said RAM means;
   second means for obtaining a previous cycle count from said RAM means; and
   third means for obtaining a cycle count two cycles previous to said present cycle count from said RAM means.

8. A GPS receiver as claimed in claim 7, wherein said means for determining said pseudorange further includes:
   first multiplier means coupled to said first means for obtaining, said first multiplier means multiplying said current cycle count by a first constant to produce a first output;
   second multiplier means coupled to said second means for obtaining, said second multiplier means multiplying said previous cycle count by a second constant to produce a second output;
   third multiplier means coupled to said third means for obtaining, said third multiplier means multiplying said cycle count two cycles previous by a third constant to produce a third output; and third adder means coupled to said first, second and third multiplier means and to said first and second adder means, said third adder means for adding said first, second and a negative of said third output to produce said pseudorange+bias output.

9. A GPS receiver as claimed in claim 8, wherein:
said first constant is approximately equal to 4.75;
said second constant is approximately equal to 6.0; and
said third constant is approximately equal to 0.75.

10. A GPS receiver as claimed in claim 7, wherein said means for determining code positions includes:
code generator means;
first multiplier means coupled to said first means for obtaining, said first multiplier means multiplying said current cycle count by a first constant to produce a first output;
second multiplier means coupled to said second means for obtaining, said second multiplier means multiplying said previous cycle count by a second constant to produce a second output;
third multiplier means coupled to said third means for obtaining, said third multiplier means multiplying said cycle count two cycles previous by a third constant to produce a third output; and
third adder means coupled to said first, second and third multiplier means, said third adder means for adding said first, a negative of said second and third outputs to produce an estimate of a cycle count for each said satellite.

11. A GPS receiver as claimed in claim 10, wherein:
said first constant is approximately equal to 14.386;
said second constant is approximately equal to 9.2178; and
said third constant is approximately equal to 2.8314.

12. A GPS receiver as claimed in claim 10, wherein said means for determining code positions further includes means for dividing said estimated cycle count by approximately 55 to produce a divided cycle count estimate.

13. A GPS receiver as claimed in claim 12, wherein means for determining code positions further includes fourth adder means coupled to said processor unit means, means for dividing and to said code generator means, said fourth adder means adding said divided cycle count estimate with a last code position from said RAM means to produce said estimated code position for said code generator means.

14. A GPS receiver as claimed in claim 10, wherein said means for determining an estimated NCO phase includes:
fourth adder means coupled to said first means for obtaining, to said third adder means and to said NCO, said fourth adder means adding said current cycle count and said estimated cycle count for each said satellite to produce a cycle count sum; and
means for extracting a fractional part of said cycle count sum, said means for extracting coupled to said fourth adder means, said means for extracting further transmitting said fractional part to said NCO as said estimated NCO phase.

15. A GPS receiver as claimed in claim 7, wherein said means for determining an estimated NCO frequency includes:
first multiplier means coupled to said first means for obtaining, said first multiplier means multiplying said current cycle count by a first constant to produce a first output;
second multiplier means coupled to said second means for obtaining, said second multiplier means multiplying said previous cycle count by a second constant to produce a second output;
third multiplier means coupled to said third means for obtaining, said third multiplier means multiplying said cycle count two cycles previous by a third constant to produce a third output; and
third adder means coupled to said first, second and third multiplier means, said third adder means for adding said first, a negative of said second and said third outputs to produce said estimated NCO frequency output.

16. A GPS receiver as claimed in claim 15, wherein:
said first constant is approximately equal to 27.284;
said second constant is approximately equal to 25.669; and
said third constant is approximately equal to 8.395.

17. A multiplexed sequential scanning method for use in a shared channel GPS receiver which receives a plurality of coded satellite signals from a plurality of satellites, the signals exhibiting Doppler shifting, the shared channel GPS receiver including a processor, random access memory (RAM), read only memory (ROM), and numerically controlled oscillator (NCO), a shared channel, and a code generator, the processor performing the multiplexed sequential scanning method comprising the steps of:
determining by the shared channel an estimated pseudorange for a satellite being scanned;
determining by the shared channel an estimated code position for the satellite being scanned;
determining by the shared channel an estimated NCO phase;
determining by the shared channel an estimated NCO frequency; and
iterating said steps of determining an estimated pseudorange, determining an estimated code position, determining an estimated NCO phase and determining an estimated NCO frequency for each of said plurality of satellites on a time division multiplexed basis.

18. A scanning method as claimed in claim 17, wherein there is further included the step of determining the identity of the satellite being tracked.

19. A scanning method as claimed in claim 18, wherein there is further included the steps of:
determining an estimate of the number of cycles for the satellite being tracked;
dividing the estimated number of cycles by 55;
adding the last code position stored in the RAM memory with the divided number of cycles to produce said estimated code position for the satellite being tracked; and
transmitting said estimated code position to the code generator.

20. A scanning method as claimed in claim 19, wherein there is further included the steps of:
determining whether all the satellites have been scanned for this cycle period;
first setting the identity of the next satellite to be scanned in the cycle period, if all the satellites have not been scanned for this cycle period; and
iterating the steps of obtaining, determining an estimated pseudorange, determining an estimated code position, determining an estimated NCO phase, determining an estimated NCO frequency, determining an estimate of the number of cycles, dividing, adding, transmitting, determining whether all the satellites have been scanned and first setting for each of these satellites being scanned for the cycle period.

21. A scanning method receiver as claimed in claim 20 wherein there is further included the steps of:
second setting a new satellite identity to be scanned;
removing an existing satellite identity from the sequential scan; and
iterating the steps of obtaining, determining an estimated pseudorange, determining an estimated code position, determining an estimated NCO phase, determining an estimated NCO frequency, determining an estimate of the number of cycles, dividing, adding, transmitting, determining whether all the satellites have been scanned, first setting, second setting and removing for each satellite scan period.

22. A scanning method as claimed in claim 17, wherein the step of determining an estimated pseudorange includes the steps of:
obtaining the current cycle count from RAM memory;
first multiplying a current cycle count by a first constant to produce a first output;
obtaining the previous cycle count from RAM memory;
second multiplying a previous cycle count by a second constant to produce a second output;
obtaining the cycle count from two cycles ago from RAM memory;
third multiplying a cycle count of two cycles previous by a third constant to produce a third output; and
adding the first, second and a negative of the third output to produce a pseudorange+bias output.

23. A scanning method as claimed in claim 22, wherein:
said first constant is approximately equal to 4.75;
said second constant is approximately equal to 6.0; and
said third constant is approximately equal to 0.75.

24. A scanning method as claimed in claim 17, wherein the step of determining an estimated pseudorange further includes the steps of:
obtaining from the code generator a pseudorange+noise;
subtracting the pseudorange+noise from the pseudorange+bias to produce bias-noise;
filtering the noise from the bias-noise to produce the bias;
subtracting the bias from the pseudorange+bias to produce a smoothed estimated pseudorange; and
transmitting the smoothed estimated pseudorange to a navigation computer.

25. A scanning method as claimed in claim 24, wherein the step of determining an estimated pseudorange further includes the steps of storing the current cycle count in RAM as a function of the satellite being scanned.

26. A scanning method as claimed in claim 17, the step of determining an estimated code position setting includes the steps of:
obtaining the current cycle count from RAM memory;
first multiplying a current cycle count by a first constant to produce a first output;
obtaining the previous cycle count from RAM memory;
second multiplying a previous cycle count by a second constant to produce a second output;
obtaining the cycle count from two cycles ago from RAM memory;
third multiplying a cycle count of two cycles previous by a third constant to produce a third output; and
adding the first, a negative of the second and the third output to produce an estimate of the cycle count.

27. A scanning method as claimed in claim 26, wherein:
said first constant is approximately equal to 14.386;
said second constant is approximately equal to 9.2178; and
said third constant is approximately equal to 2.8314.

28. A scanning method as claimed in claim 26, wherein said step of determining an estimated NCO phase includes the steps of:
re-obtaining the current cycle count from RAM;
adding the current cycle count to the estimate of the cycle count to produce a first sum;
taking the fractional part of the first sum to produce the estimated NCO phase; and
transmitting the NCO phase to the NCO.

29. A scanning method as claimed in claim 17, wherein the step of determining as estimated NCO frequency includes the steps of:
obtaining the current cycle count from RAM memory;
first multiplying a current cycle count by a first constant to produce a first output;
obtaining the previous cycle count from RAM memory;
second multiplying a previous cycle count by a second constant to produce a second output;
obtaining the cycle count from two cycles ago from RAM memory;
third multiplying a cycle count of two cycles previous by a third constant to produce a third output;
adding the first, a negative of the second and third outputs to produce the estimate of the NCO frequency; and
transmitting the estimated NCO frequency to the NCO.

30. A scanning method as claimed in claim 29, wherein
said first constant is approximately equal to 27.284;
said second constant is approximately equal to 25.669; and
said third constant is approximately equal to 8.395.

31. In a Global Positioning System (GPS), a GPS receiver for receiving a plurality of coded satellite signals from a plurality of satellites, said signals exhibiting Doppler shifting, said GPS receiver comprising:
means for converting said coded satellite signals to intermediate frequency signals;
A/D means coupled to said means for converting, said A/D means for simultaneously translating said intermediate frequency signals for said plurality of coded satellite signals to a plurality of digital signals;
correlation means coupled to said A/D means, said correlation means for simultaneously separating each of said plurality of digital signals corresponding to each said satellite to provide channel information signals for each said satellite;

first channel means coupled to said correlation means, said first channel means for continuously receiving said coded satellite signals from a particular one of said plurality of satellites for a period;

second channel means coupled to said correlation means, said channel means for estimating a plurality of parameters describing said satellite's expected position and an expected frequency of transmission of said coded satellite signals including Doppler compensation for all of said plurality of said satellites except said particular one of said satellites on a time division multiplexed basis; and processor means coupled to said correlation means and to said first and second channel means, said processor means for retrieving information transmitted from each of said satellites in response to channel information signals.

32. A GPS receiver as claimed in claim 31, wherein there is further included means for selecting which said particular satellite of said plurality of satellites is continuously being received by said first channel means.

* * * * *